United States Patent
Kurihara et al.

Patent Number: 6,130,510
Date of Patent: Oct. 10, 2000

[54] ELECTRIC DISCHARGE MACHINING POWER SOURCE UNIT FOR ELECTRIC DISCHARGE MACHINE

[75] Inventors: Masaki Kurihara, Setagaya-ku; Masao Murai, Oshino-mura; Akihiro Sakurai, Oshino-mura; Akiyoshi Kawahara, Oshino-mura, all of Japan

[73] Assignee: Fanuc Ltd., Yamanashi, Japan

[21] Appl. No.: 09/284,280

[22] PCT Filed: Aug. 11, 1998

[86] PCT No.: PCT/JP98/03574

§ 371 Date: Apr. 12, 1999

§ 102(e) Date: Apr. 12, 1999

[87] PCT Pub. No.: WO99/07510

PCT Pub. Date: Feb. 18, 1999

[30] Foreign Application Priority Data

Aug. 11, 1997 [JP] Japan .................................. 9-227012

[51] Int. Cl.$^7$ .................................................. H05B 37/02
[52] U.S. Cl. .................. 315/225; 219/69.13; 219/69.16; 219/69.18; 323/282
[58] Field of Search ..................... 315/225, 226, 315/160, 163, 295, 307; 323/282, 290; 219/69.13, 69.18, 69.16

[56] References Cited

U.S. PATENT DOCUMENTS

| | | | |
|---|---|---|---|
| 3,120,619 | 2/1964 | Webb | 307/88.5 |
| 4,004,123 | 1/1977 | Inoue | 219/69 C |
| 5,162,631 | 11/1992 | Hachisuka et al. | 219/69.13 |
| 5,306,889 | 4/1994 | Kaneko et al. | 219/69.12 |
| 5,359,169 | 10/1994 | Kaneko | 219/69.13 |
| 5,603,852 | 2/1997 | Goto et al. | 219/69.16 |
| 5,770,831 | 6/1998 | Kaneko et al. | 219/69.18 |
| 5,872,347 | 2/1999 | Li et al. | 219/69.13 |
| 5,903,067 | 5/1999 | Sato et al. | 219/69.13 |

FOREIGN PATENT DOCUMENTS

| | | | |
|---|---|---|---|
| 62-287911 | 12/1987 | Japan . | |
| 07290317 | 11/1995 | Japan | B23H 1/02 |

*Primary Examiner*—Don Wong
*Assistant Examiner*—Thuy Vinh Trn
*Attorney, Agent, or Firm*—Staas & Halsey, LLP

[57] ABSTRACT

When a state for electric discharge is established, switching elements T2 and T3 are turned on so that a machining current J0 from a low-voltage auxiliary DC power source (2) flows between a workpiece (W) and a machining electrode (P). Thereupon, an electric discharge machining current J0 sharply rises as a high voltage is applied from a main DC power source (1). When the switching element T1 is turned off, the electric discharge machining current (J0) reaches its peak value, which is maintained by the current from the auxiliary DC power source (2). When the switching elements T2 and T3 are turned off, a current produced by induced energy is fed back to the main DC power source (1) through diodes D1 and D2, whereupon the machining current sharply falls.

8 Claims, 11 Drawing Sheets

ELECTRIC DISCHARGE MACHINING POWER SOURCE UNIT FOR ELECTRIC DISCHARGE MACHINE

TECHNICAL FIELD

The present invention relates to an electric discharge machining power source unit for an electric discharge machine.

BACKGROUND ART

The narrower the current pulse width of discharge current, and the larger the peak value of the discharge current, the more the speed of electric discharge machining can be improved. Referring to FIGS. 7A and 7B, there will be described a prior art example of an electric discharge machining power source unit that can give a high peak current value with such a narrow pulse width.

The positive terminal of a DC power source 10 and a workpiece W are connected through a first switching element T11, while the negative terminal of the DC power source 10 and a machining electrode P are connected through a second switching element T12. Further, the negative terminal of the DC power source 10 and the workpiece W are connected through a reversely-connected first diode D11, while the positive terminal of the DC power source 10 and the machining electrode P are connected through a reversely-connected second diode D12.

The first and second switching elements T11 and T12 are each formed of a FET. As shown in FIG. 7B, their respective gates G11 and G12 are controlled by means of a first switching element driver circuit 11 and a second switching element driver circuit 12, respectively. The first and second switching element driver circuits 11 and 12 are driven by means of pulses with a given pulse width delivered from a pulse signal generator circuit 13 for current peak value setting.

When conditions for electric discharge between the workpiece W and the electrode P are fulfilled, the pulses with the set width are delivered from the pulse signal generator circuit 13 for current peak value setting. These pulses are applied to the respective FET gates G11 and G12 of the first and second switching elements T11 and T12 through the first and second switching element driver circuits 11 and 12, thereby turning on both these switching elements T11 and T12.

Thereupon, a discharge current J0 from the DC power source flows through the first switching element T11, workpiece W, machining electrode P, and second switching element T12 to the DC power source 10. When the pulses with the set width from the pulse signal generator circuit 13 for current peak value setting then die out, both the switching elements T11 and T12 are turned off.

After both the switching elements T11 and T12 are turned off, a current J1 (=J0) produced by induced energy that is accumulated by inductance in this electric discharge circuit is fed back to the DC power source 10 through the first diode D11, workpiece W, machining electrode P, and second diode D12.

The workpiece W is subjected to electric discharge machining using the current J0 (machining current) that flows between the workpiece W and the machining electrode P in this manner.

Referring now to FIGS. 8 and 9, there will be described discharge currents (machining currents) that are obtained when the power source unit shown in FIGS. 7A and 7B is operated in the aforesaid manner. FIG. 8 shows current waveforms for the case where the voltage of the DC power source is raised, and FIG. 9 for the case where the voltage of the DC power source 10 is lowered.

When both the first and second switching elements T11 and T12 are turned on by means of pulse signals (with a pulse width t1) from the pulse signal generator circuit 13 for current peak value setting (see (a) and (b) of FIG. 8 and (a) and (b) of FIG. 9), the voltage of the DC power source 10 is applied between the workpiece W and the machining electrode P. Thereupon, the current J0 that flows between the workpiece W and the machining electrode P is caused to increase with time by inductance in the circuit of FIG. 7A. If the voltage of the DC power source 10 is high, in this case, the current J0 rises sharply (see (c) of FIG. 8). If the voltage is low, on the other hand, the current J0 rises gently (see (c) of FIG. 9).

When both the first and second switching elements T11 and T12 are turned off, the feedback current J1 (FIG. 7A) flows through the first and second diodes D11 and D12. The falling speed of this current also increases if the voltage of the DC power source 10 is high ((d) of FIG. 8), and decreases if the voltage is low ((d) of FIG. 9).

As seen from the above description, a peak value Jp of the discharge current is determined by the output voltage of the DC power source 10 and the pulse width t1 of the pulse signals delivered from the pulse signal generator circuit 13 for current peak value setting. On the other hand, a fall time t2 of the feedback current J1 after concurrent deactivation of the first and second switching elements T11 and T12 is determined by the voltage of the DC power source 10. The sum of the times t1 and t2 is equal to a machining pulse width Pw.

FIG. 10 shows relations between the current peak value setting pulse width t1, current peak value Jp, and DC power source voltage V. FIG. 10 indicates that the lower the voltage V of the DC power source (V1>V2>V3), the wider the current peak value setting pulse width t1 must be made in order to obtain the same current peak value Jp.

FIG. 11 shows machining pulse widths Pw1 and Pw2 for the cases where V1 and V3 (V1>V3) are used as the voltage V of the DC power source 10 to obtain the same current peak value JP. FIG. 11 indicates that if the voltage V of the DC power source is high (that is, where V=V1), both the current peak value setting pulse width t1 and the fall time t2 of the current are reduced (as compared to the case where V=V3 is given), so that the machining pulse width, which is equal to t1+t2, is reduced (i.e., Pw1<Pw3).

In order to obtain the target machining pulse width (t1+t2) and the current peak value Jp as machining conditions, as described above, the value of the voltage V of the DC power source must be determined besides the current peak value setting pulse width t1.

There is a case in which the DC power source is divided between a DC power source (main DC power source) for applying the discharge current and a DC power source for energy regeneration, the voltage value V of the main DC power source being fixed to be constant, and the voltage value of the DC power source for energy regeneration being adjustable (i.e., the value of t2 being adjustable), in order to solve this problem. This case will now be described with reference to FIG. 12.

When both first and second switching elements T11 and T12 are turned on, a voltage V of a main DC power source 10 is applied between a workpiece W and an electrode P, and a discharge current J0 flows there. When both the first and second switching elements T11 and T12 are turned off, a current J1 produced by induced energy that is accumulated by inductance in the circuit of FIG. 12 returns to a power source 20 for energy regeneration through a first diode D11, the workpiece W, the machining electrode P, and a second diode D12.

Since the voltage of the main DC power source 10 in FIG. 12 is fixed to be constant, a current peak value Jp is determined by a pulse width with which both the first and second switching elements T11 and T12 are turned on, that is, a current peak value setting pulse width t1. On the other hand, a fall time t2 of the current is determined by the voltage of the DC power source 20 for regeneration. This time t2 can be adjusted by regulating the voltage of the DC power source 20 for regeneration. In consequence, a machining pulse width (t1+t2) can be selected by regulating the voltage of the DC power source 20 for regeneration.

Referring now to FIGS. 13 and 14, there will be described the way the machining pulse width (t1+t2) can be adjusted by means of the electric discharge machining power source circuit shown in FIG. 12.

FIG. 13 is a diagram showing current waveforms and the like for the case where the voltage of the DC power source 20 for regeneration is raised in the electric discharge machining power source circuit shown in FIG. 12. FIG. 14 is a diagram showing current waveforms and the like for the case where the voltage of the DC power source 20 for regeneration is lowered.

The current peak value Jp is determined by the current peak value setting pulse width t1 with which the switching elements T11 and T12 are turned on and the voltage (constant) of the main DC power source. Thus, if the current peak value setting pulse width t1 is common to both cases of FIGS. 13 and 14, therefore, the current peak value Jp is also a common value.

On the other hand, the fall time t2 of the current is determined by the voltage (variable) of the DC power source 20 for regeneration. Therefore, the current fall time t2 is shortened in the case of FIG. 13 (where the voltage of the DC power source 20 for regeneration is high) and is lengthened in the case of FIG. 14 (where the voltage of the DC power source 20 for regeneration is low). Accordingly, the machining pulse width Pw (=t1+t2) can be adjusted by regulating the voltage of the DC power source 20 for regeneration.

In any of the conventional methods described above, however, the discharge current waveforms are triangular, thus constituting a substantial hindrance to the improvement of the electric discharge machining characteristics.

Electric discharge in electric discharge machining starts with finding out an infinitesimal conduction path of scores of micrometers or less in a gap between the electrode and the workpiece, then supplying a pulse current there, and forcing the infinitesimal conduction path or infinitesimal portions of the electrode and the workpiece in contact with it to transpire or fuse and scatter by means of heat energy produced there. Thus, the degree of the transpiration or fusional scattering in the infinitesimal portions is determined by the level of the rate of change in the pulse current with respect to time, that is, the levels of the current having a sharp leading edge and the current peak value, the thermal properties of the electrode, workpiece material, etc., the cooling properties of an insulating solution, and the like.

If the workpiece is formed of a material with low electric resistance, heat generation attributable to Joule heat is low. If it is formed of a material with high thermal conductivity, heat generation or temperature rise in the infinitesimal portions can be restrained. Further, a material with substantial fusion latent heat and high fusion temperature cannot easily fuse if it is heated. A material that is highly viscous when it is fused is not ready to scatter if it is fused.

In actual machining, the combination of these conditions results in phenomena including low machining speed, high or low surface roughness, liability to short-circuiting, low machining efficiency, liability to concentrated electric discharge, etc. In wire electric discharge machining, the combined conditions result in frequent short-circuiting, frequent breaking of wire, etc.

Conventionally, the possibility of short-circuiting is eliminated by using an alloy material with low fusion temperature or low fusion latent heat or low fused-state viscosity for the electrode. This material, which may be an alloy of brass or the like, entails dissipation of the electrode and other problems, so that it is not often used in any other apparatuses than wire electric discharge machines and high-speed perforating machines. Wire electrodes for wire electric discharge machining include special wires that are coated with a material having low fusion temperature and low fused-state viscosity. They have an effect to prevent the aforesaid short-circuiting, thereby improving the machining efficiency.

After electric discharge is started, the insulating solution around the electric discharge is evaporated to form bubbles that expand suddenly. The fused portions are scooped out by the counteraction of the internal pressure. While the fused portions gradually spread as the electric discharge continues, the density of the generated internal pressure gradually lowers as the bubbles expand. Accordingly, there is a maximum value of scooped margin that depends on the material and discharge time, so that machining efficiency may lower when the discharge time (pulse width) is either short or long. Application for an unduly long discharge time (pulse width) is undesirable because the applied energy is consumed for heating and fusing of the electrode and the workpiece, in particular, so that the work surface tends to involve a thick fused layer.

It is desired, therefore, that each of various conditions including the discharge time (pulse width) as machinability, as well as the levels of the current peak value and the current rise speed as electric discharge starting capability, can be selected independently of one another, according to differences in an electrode, a workpiece, and a themal property of insulating solution. In regions with very narrow pulse widths, as mentioned before, efficient machining cannot be effected with use of pulses that have triangular waveforms X+.

DISCLOSURE OF THE INVENTION

The object of the present invention is to provide an electric discharge machining power source unit for an electric discharge machine, capable of obtaining electric discharge machining current pulses that rise and fall sharply and ensure satisfactory machining efficiency.

In order to achieve the above object, an electric discharge machining power source unit according to the present invention comprises: a first DC power source; a second DC power source designed for an output voltage lower than that of the first DC power source; a pulse generator circuit for respectively outputting first pulses having a set first width and second pulses having a set second width at time intervals; a first circuit for applying a voltage from the first DC power source between a machining electrode and a workpiece while the first pulses are being outputted; a second circuit for applying a voltage from the second DC power source between the machining electrode and the workpiece while the second pulses are being outputted; and a third circuit adapted to feed back a current produced by induced energy accumulated by inductance in the second circuit to the first DC power source when the delivery of the first pulses is stopped and the delivery of the second pulses is stopped thereafter.

According to the present invention, the peak value of an electric discharge machining current and the machining pulse width can be set with ease, and an electric discharge machining current having a substantially square waveform can be obtained that rises and falls sharply in a short time, so that the electric discharge machining efficiency can be improved. Since the machining current having a sharp and narrow square waveform can be obtained, hard metal materials, such as tungsten carbide, and electrically conductive ceramics that are liable to thermal-shock cracks can be machined with high efficiency. A wire electric discharge machine can be remarkably improved in machining speed compared to work surface roughness, in particular.

BEST MODE FOR CARRYING OUT THE INVENTION

The construction and operation of an electric discharge machining power source unit according to a first embodiment of the present invention will be described with reference to FIGS. 1A, 1B and 4.

The positive terminal of a main DC power source 1 is connected to a workpiece W through a first switching element T1, while the negative terminal thereof is connected to a machining electrode P through a second switching element T2. Further, the positive terminal of an auxiliary DC power source 2 is connected to the workpiece W through a third switching element T3, while the negative terminal thereof is connected to the negative terminal of the main DC power source 1.

Furthermore, a first diode D1 is reversely connected between the negative terminal of the main DC power source 1 (and the auxiliary DC power source 2) and the workpiece W. A second diode D2 is reversely connected between the positive terminal of the main DC power source 1 and the machining electrode P.

Figure 1A:
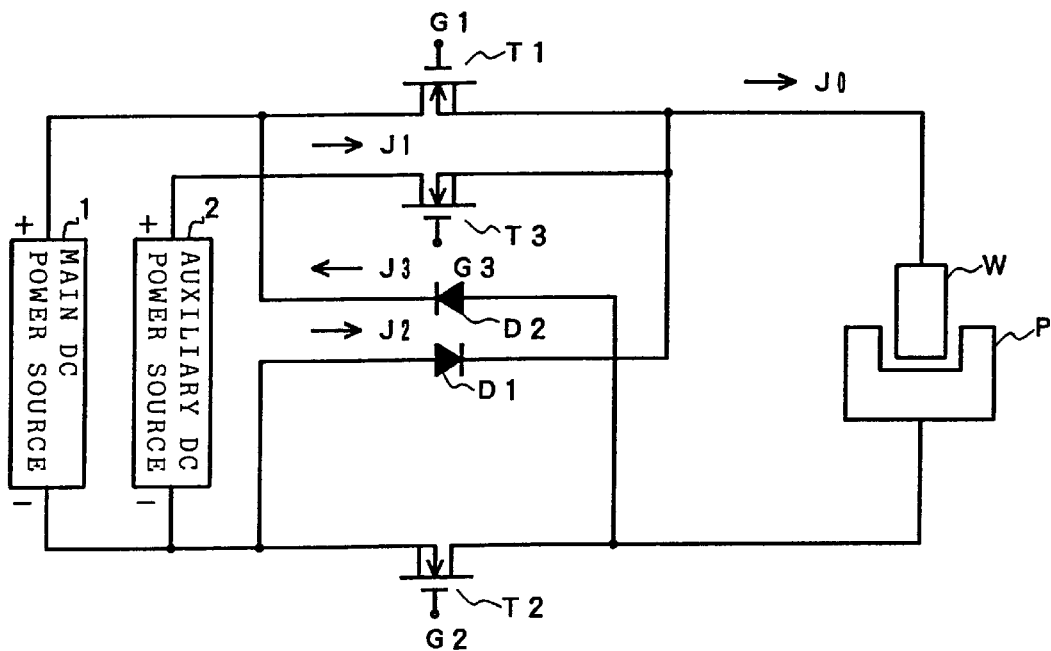
FIGS. 1A and 1B are circuit diagrams of an electric discharge machining power source unit according to a first embodiment of the present invention.
Figure 1B:
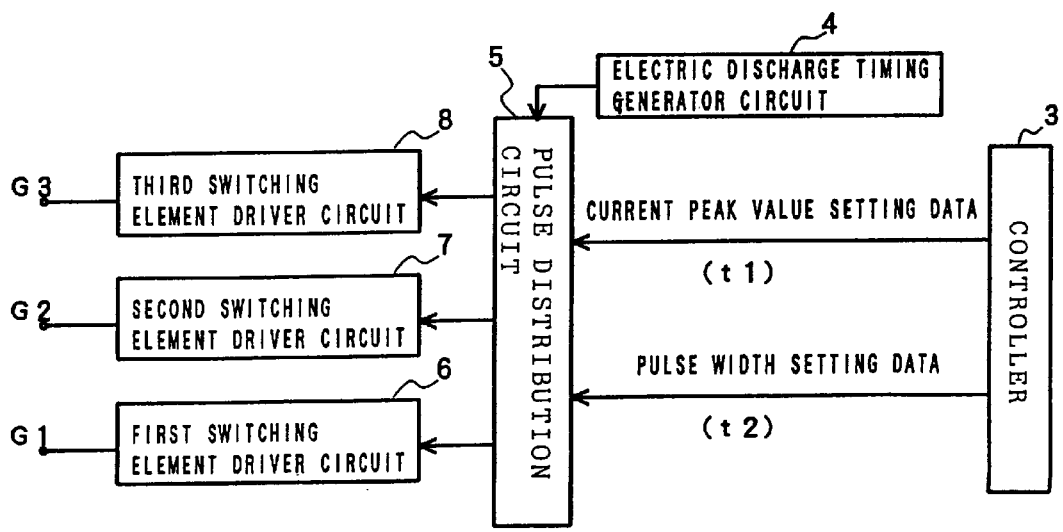

In FIG. 1A, the workpiece W and the machining electrode P are connected to the positive and negative sides, respectively, of the main DC power source 1. In some cases, however, the workpiece W and the machining electrode P may be connected contrariwise, that is, to the negative and positive sides, respectively, of the main DC power source 1.

The first, second, and third switching elements T1, T2 and T3 are formed of a transistor or FET each. In the present embodiment, they are formed of an FET each. As shown in FIG. 1B, first, second, and third switching element driver circuits 6, 7 and 8 are connected, respectively, to gates G1, G2 and G3 of the FETs that individually constitute the switching elements T1, T2 and T3.

The first, second, and third switching element driver circuits 6, 7 and 8 are designed to turn on and off the first, second, and third switching elements T1, T2 and T3, respectively, in response to pulses delivered from a pulse distribution circuit 5. The pulse distribution circuit 5 is formed of a monostable multivibrator or the like.

The pulse distribution circuit 5 outputs pulses with pulse widths previously determined in accordance with current peak value setting data (t1) and pulse width setting data (t2) delivered from a controller 3 for controlling an electric discharge machine, in response to timing signals delivered from an electric discharge timing generator circuit 4, thereby turning on the first, second, and third switching elements T1, T2 and T3, as mentioned later. The electric discharge timing generator circuit 4 (a detection circuit of which is not shown) detects electric discharge or conduction between the workpiece W and the machining electrode P, and outputs the timing signals in accordance with conditions for electric discharge between the machining electrode P and the workpiece W.

Figure 4:
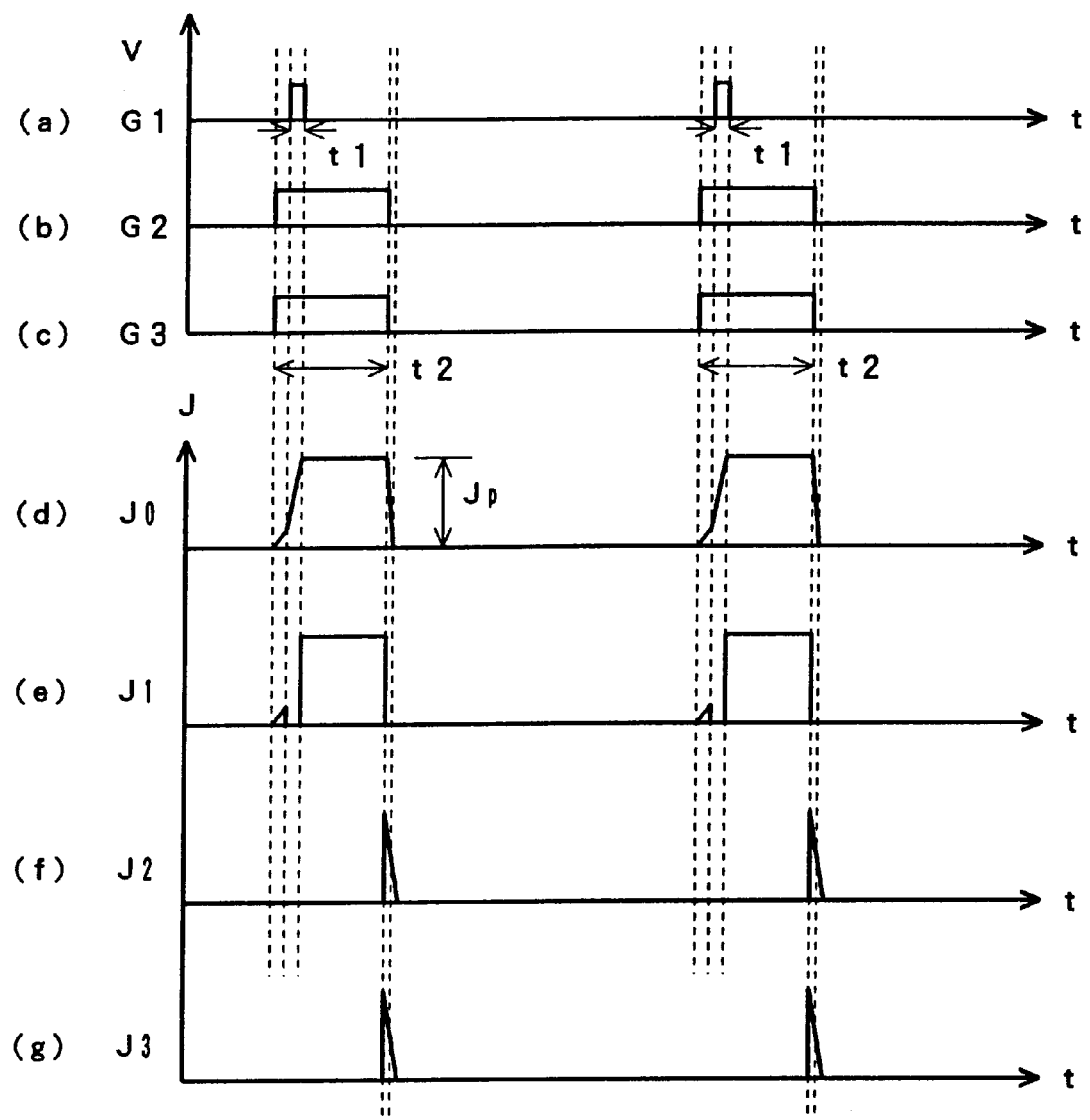
FIG. 4 is a diagram showing the operation timing and discharge current (machining current) waveforms for the electric discharge machining power source unit of FIGS. 1A and 1B.

FIG. 4 shows the operation timing and discharge current (machining current) waveforms for the electric discharge machining power source unit according to the first embodiment.

When a timing signal is delivered from the electric discharge timing generator circuit 4 in accordance with the conditions for electric discharge between the machining electrode P and the workpiece W, the pulse distribution circuit 5 first outputs a pulse with a time width t2 that is previously set in accordance with the pulse width setting data, and causes the second and third switching element driver circuits 7 and 8 to turn on the second and third switching elements T2 and T3 ((b) and (c) of FIG. 4). In consequence, low voltage from the auxiliary DC power source 2 is applied between the workpiece W and the machining electrode P through the third switching element T3 and the second switching element T2, and a current J1 (=J0) flows from the auxiliary DC power source 2 to secure conduction points ((e) of FIG. 4). Since the output voltage of the auxiliary DC power source 2 is low, this current rises gently.

With a certain set time delay behind the point of time for the start of delivery of the pulse with the time width t2, a pulse with a time width t1 set in accordance with the current peak value setting data is delivered from the pulse distribution circuit 5 ((a) of FIG. 4), whereupon the first switching element driver circuit 6 is caused to turn on the first switching element T1. In consequence, high voltage from the main DC power source 1 is applied between the workpiece W and the machining electrode P through the first switching element and the second switching element T2, and the current J0 starts to flow from the main DC power source 1, whereupon the machining current J0 between the workpiece W and the machining electrode P sharply rises, as indicated by (d) of FIG. 4.

When the first switching element T1 is turned off after the passage of the set time t1, the rise of the machining current J0 stops, whereupon the current J1 from the auxiliary DC power source 2 is supplied again between the workpiece W and the machining electrode P, and the machining current J0 (=J1) flows without changing its peak value.

When both the second and third switching elements T2 and T3 are turned off after the passage of the set time t2, currents J2 and J3 produced by induced energy that is accumulated by inductance in the circuit of FIG. 1A flow through the first diode D1, workpiece W, machining electrode P, and second diode D2, and are fed back to the high-voltage main DC power source 1. Accordingly, the fall of this machining current (J2=J3=J0) is sharp. Thereafter, this operation is repeatedly executed to effect electric discharge machining.

According to the electric discharge machining power source unit of the first embodiment, the machining pulse width can be substantially determined by the pulse width setting data (t2) for turning on the second and third switching elements T2 and T3, as indicated by (d) of FIG. 4. Further, a peak value JP of the current can be determined by the current peak value setting data (t1) for turning on the first switching element T1. Thus, the current peak value and the machining pulse width can be determined independently of each other, so that these values can be set with ease. Since the rise and fall of the machining current can be sharpened by utilizing a main DC power source of high voltage, moreover, a substantially square machining current waveform can be obtained, so that the machining efficiency can be improved.

In the case shown in FIG. 4, the first switching element T1 is turned on after the passage of a short time since the second and third switching elements T2 and T3 are turned on. However, the first switching element T1 may be turned on at the same time when, or even before, the second and third switching elements T2 and T3 are turned on. The time for the start of activation of the first switching element T1 can only be adjusted for a lag or lead with respect to the time for the start of activation of the second and third switching elements T2 and T3, according to the material of the workpiece W and the like.

Figure 2A:
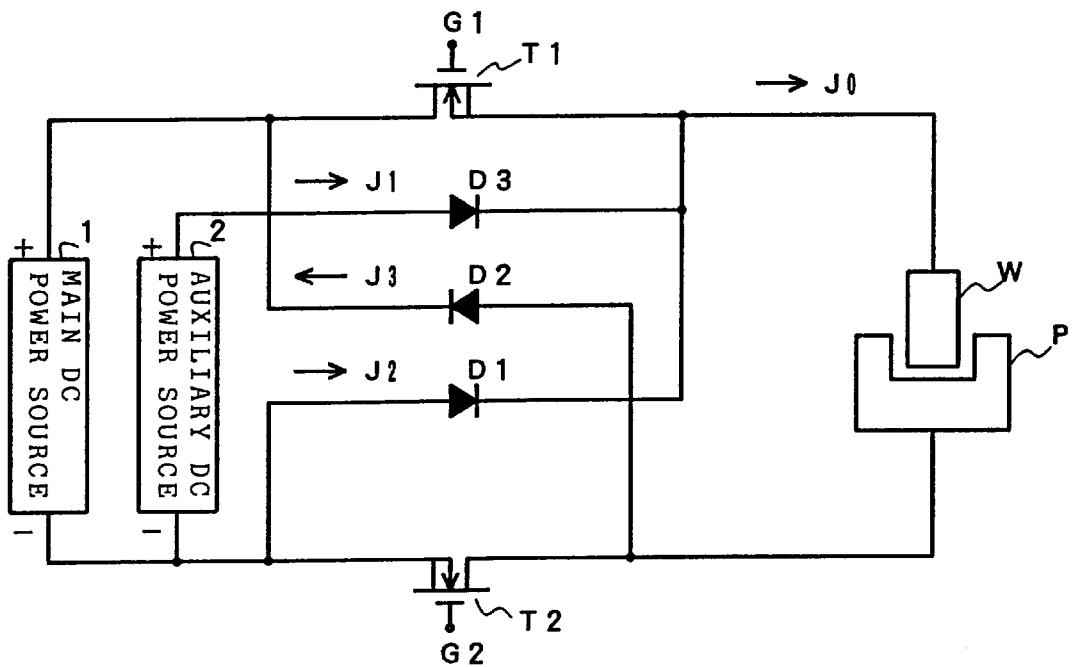
FIGS. 2A and 2B are circuit diagrams of an electric discharge machining power source unit according to a second embodiment of the present invention.
Figure 2B:
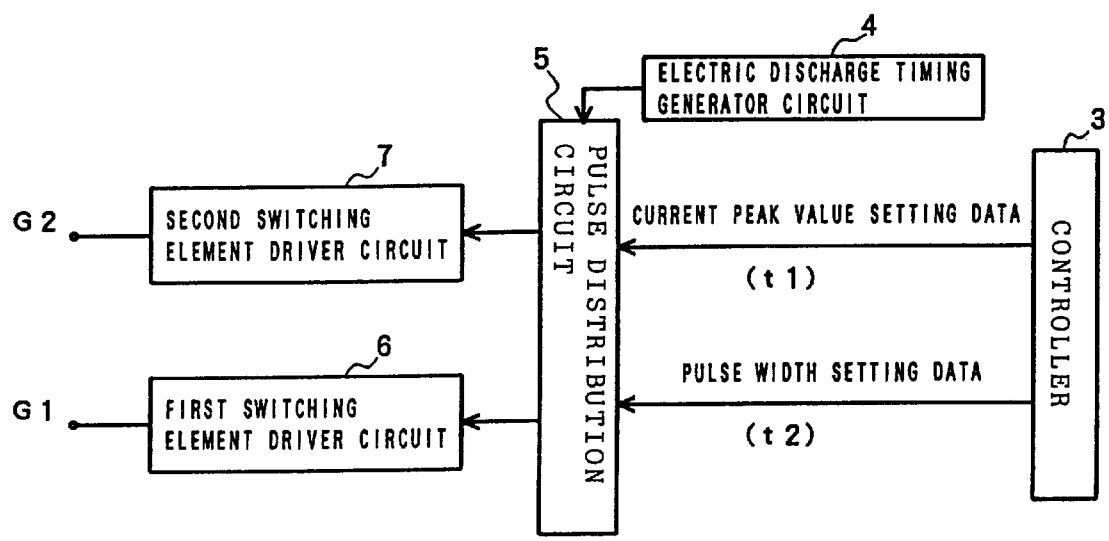
Figure 5:
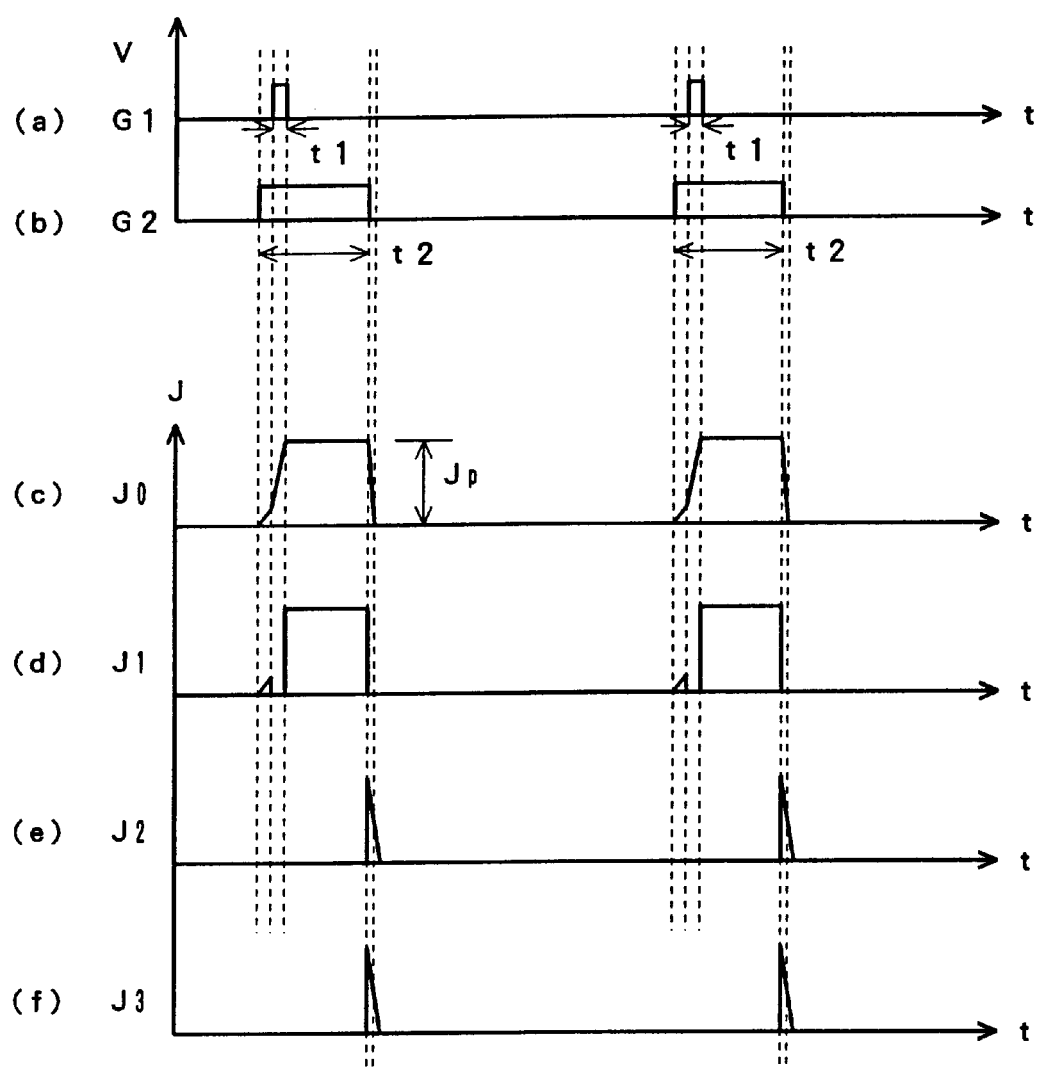
FIG. 5 is a diagram showing the operation timing and discharge current (machining current) waveforms for the electric discharge machining power source unit of FIGS. 2A and 2B.

Referring now to FIGS. 2A, 2B and 5, there will be described the construction and operation of an electric discharge machining power source unit according to a second embodiment of the present invention.

The electric discharge machining power source unit according to this second embodiment (FIGS. 2A and 2B) is equivalent to a modified version of the electric discharge machining power source unit according to the first embodiment (FIGS. 1A and 1B), in which a (third) diode D3 is used in place of the third switching element T3, and the third switching element driver circuit 8 is removed to match the modification.

When a timing signal is delivered from the electric discharge timing generator circuit 4, the pulse distribution circuit 5 first outputs a pulse with a time width t2 that is set in accordance with the pulse width setting data (t2), and causes the second switching element driver circuit 7 to turn on the second switching element T2, as indicated by ((b) of FIG. 5.

In consequence, a current J1 (=J0) flows from the auxiliary DC power source 2 to the workpiece W, machining electrode P, second switching element T2, and auxiliary DC power source 2 through the third diode D3, whereupon conduction points are secured ((c) and (d) of FIG. 5). Since the output voltage of the auxiliary DC power source 2 is low, this current rises gently.

Subsequently, however, a pulse with a time width t1 set in accordance with the current peak value setting data (t1) is delivered from the pulse distribution circuit 5 with a certain set time delay ((a) of FIG. 5), whereupon the first switching element driver circuit 6 is caused to turn on the first switching element T1. In consequence, high voltage from the main DC power source 1 is applied between the workpiece W and the machining electrode P through the first switching element T1 and the second switching element T2, and the current J0 starts to flow from the main DC power source 1, whereupon the machining current J0 between the workpiece W and the machining electrode P sharply rises, as indicated by (c) of FIG. 5.

When the first switching element T1 is turned off after the passage of the set time t1, the rise of the machining current J0 stops, whereupon the current J1 from the auxiliary DC power source 2 is supplied again between the workpiece W and the machining electrode P through the diode D3, and the machining current J0 (=J1) flows without changing its peak value.

When the second switching element T2 is turned off after the passage of the set time t2, currents J2 and J3 produced by induced energy that is accumulated by inductance in the circuit of FIG. 2A flow through the first diode D1, workpiece W, machining electrode P, and second diode D2, and are fed back to the main DC power source 1. Accordingly, the fall of this machining current (J2=J3=J0) is sharp. Thereafter, this operation is repeatedly executed to effect electric discharge machining.

In the case of this second embodiment also, the machining pulse width can be substantially determined by the pulse width setting data (t2), as indicated by (c) of FIG. 5. Further, a peak value JP of the current can be determined by the current peak value setting data (t1) for turning on the first switching element T1. Thus, the current peak value JP and the machining pulse width can be determined independently of each other, so that these values can be set with ease. Since the rise and fall of the machining current can be sharpened by utilizing a main DC power source of high voltage, moreover, a substantially square machining current waveform can be obtained, so that the machining efficiency can be improved.

Figure 3A:
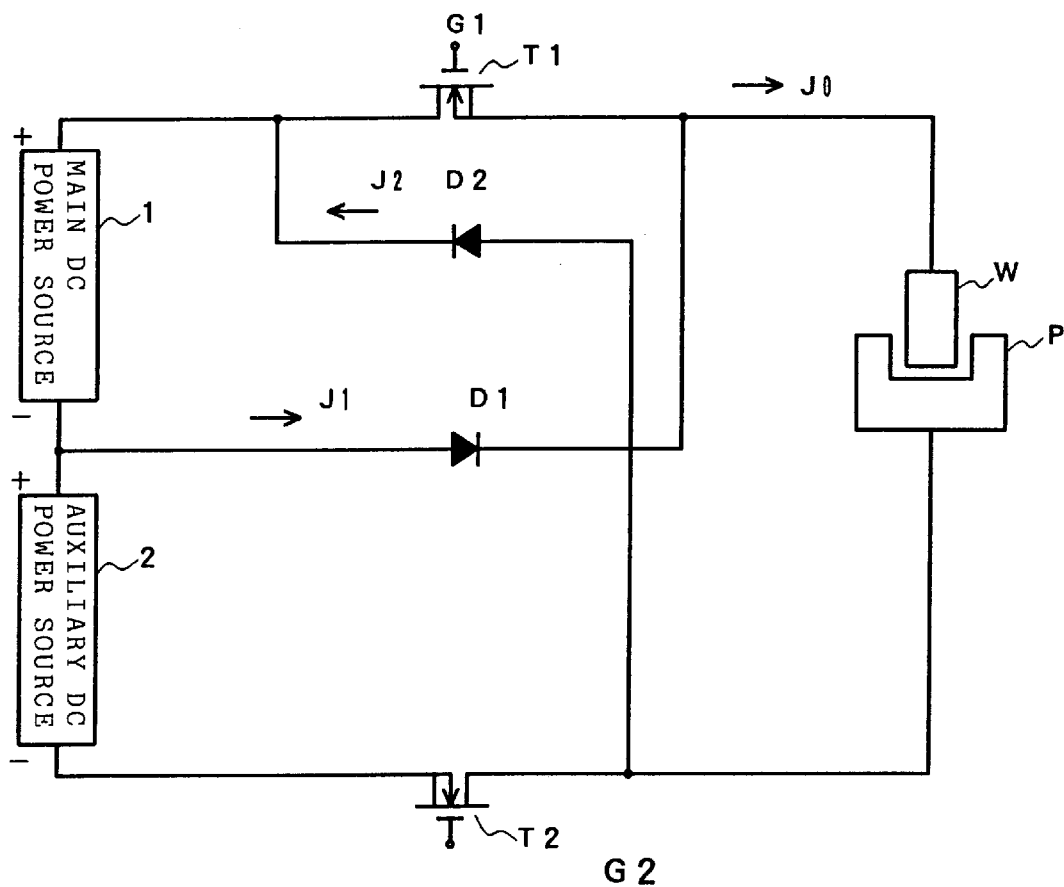
FIGS. 3A and 3B are circuit diagrams of an electric discharge machining power source unit according to a third embodiment of the present invention.
Figure 3B:
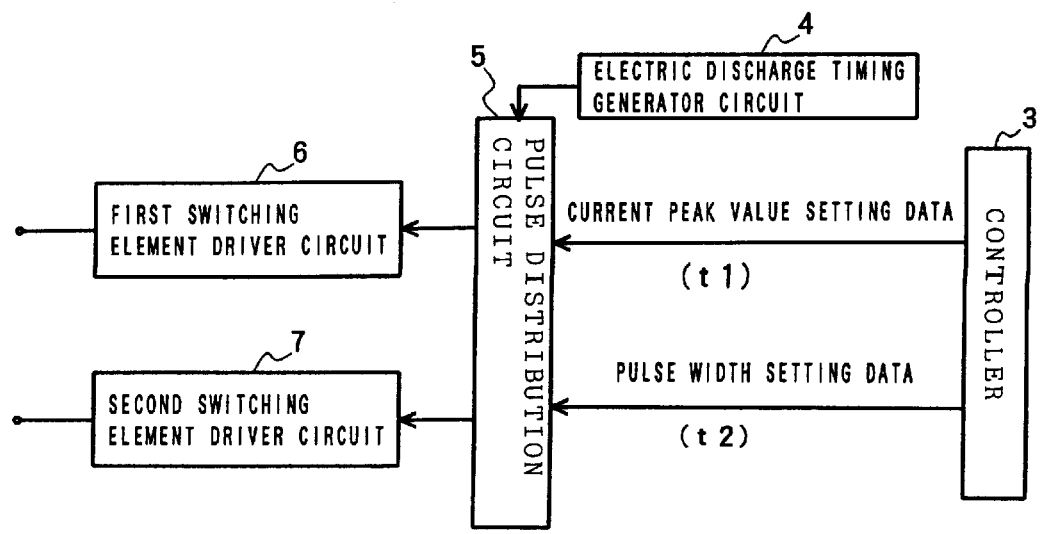
Figure 6:
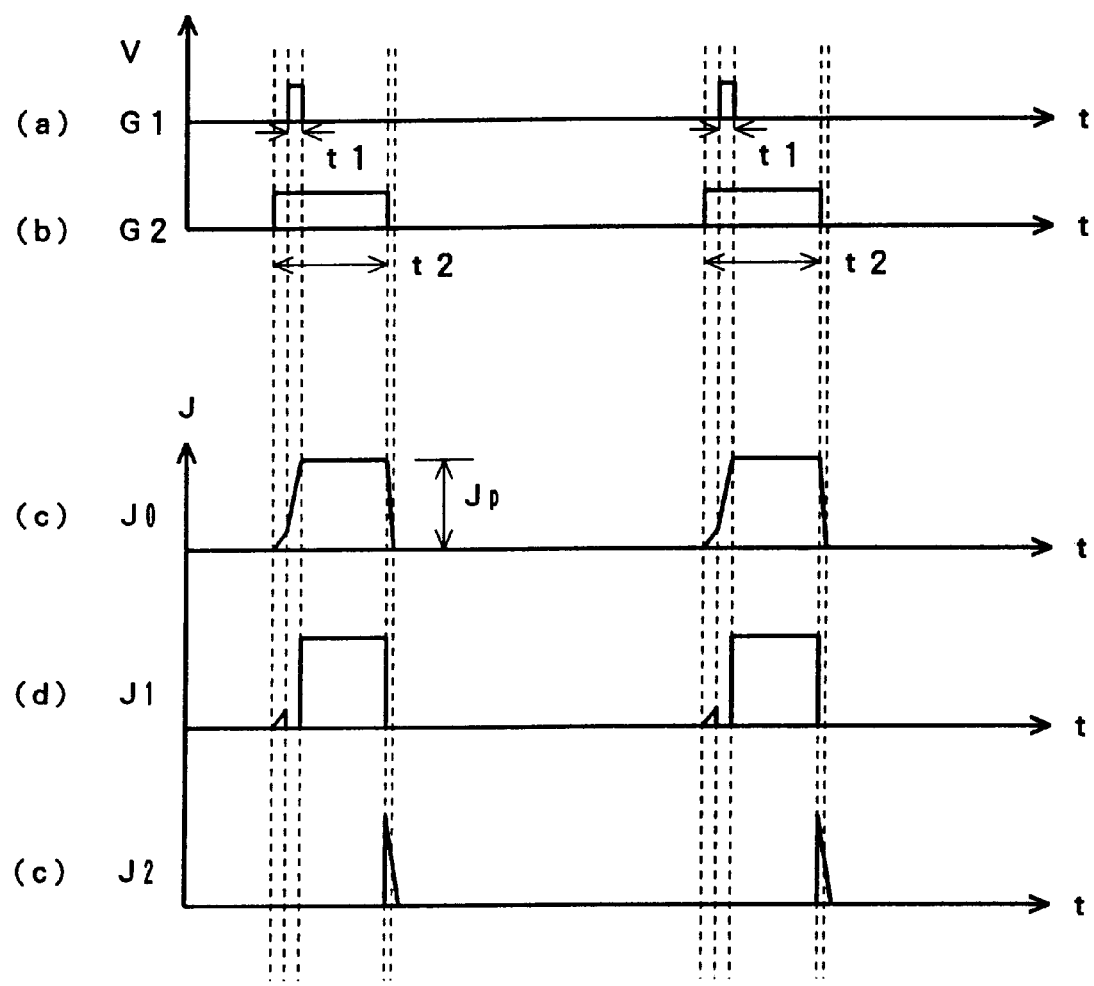
FIG. 6 is a diagram showing the operation timing and discharge current (machining current) waveforms for the electric discharge machining power source unit of FIGS. 3A and 3B.
Figure 7A:
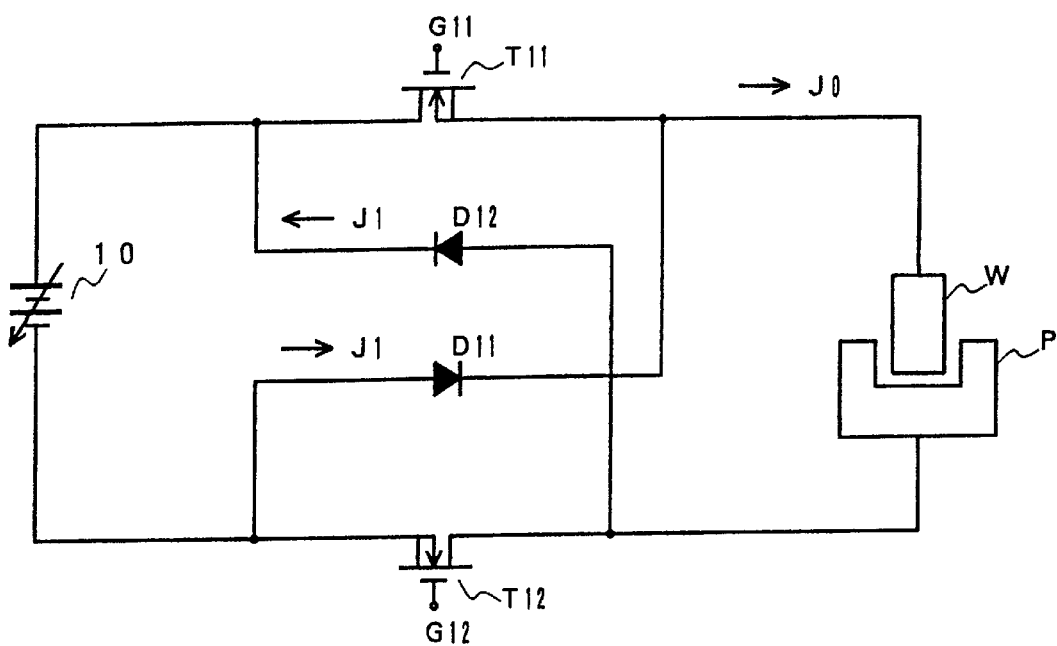
FIGS. 7A and 7B are circuit diagrams of a conventional electric discharge machining power source unit.
Figure 7B:
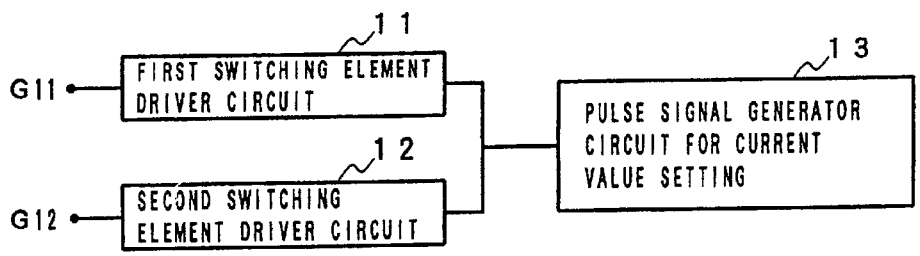
Figure 8:
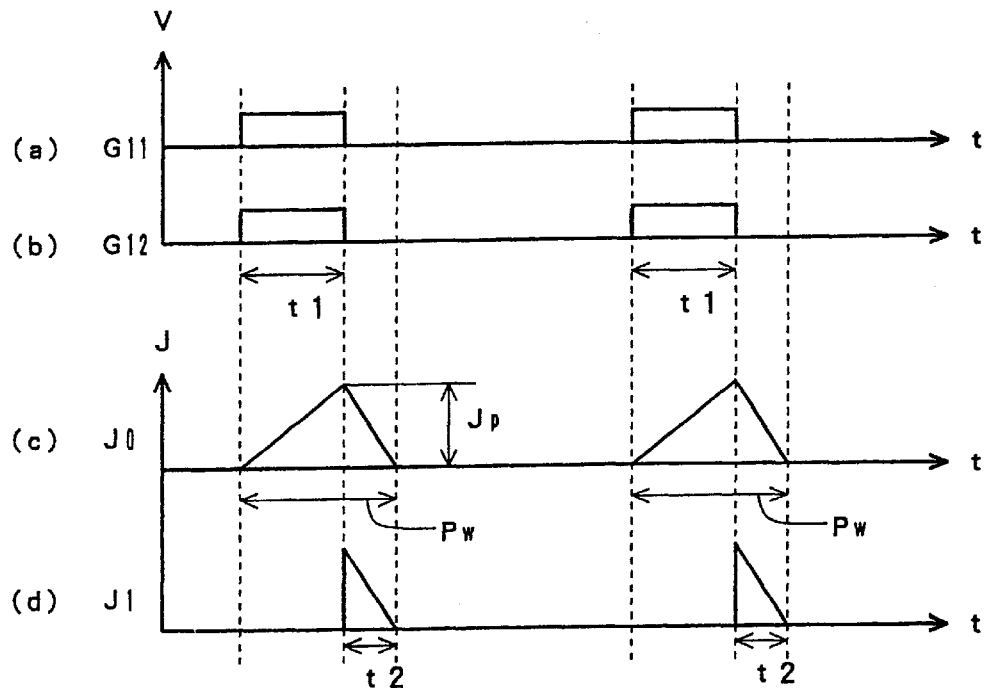
FIG. 8 is a diagram showing the operation timing and discharge current waveforms obtained when a DC power source voltage is raised in the electric discharge machining power source unit of FIGS. 7A and 7B.
Figure 9:
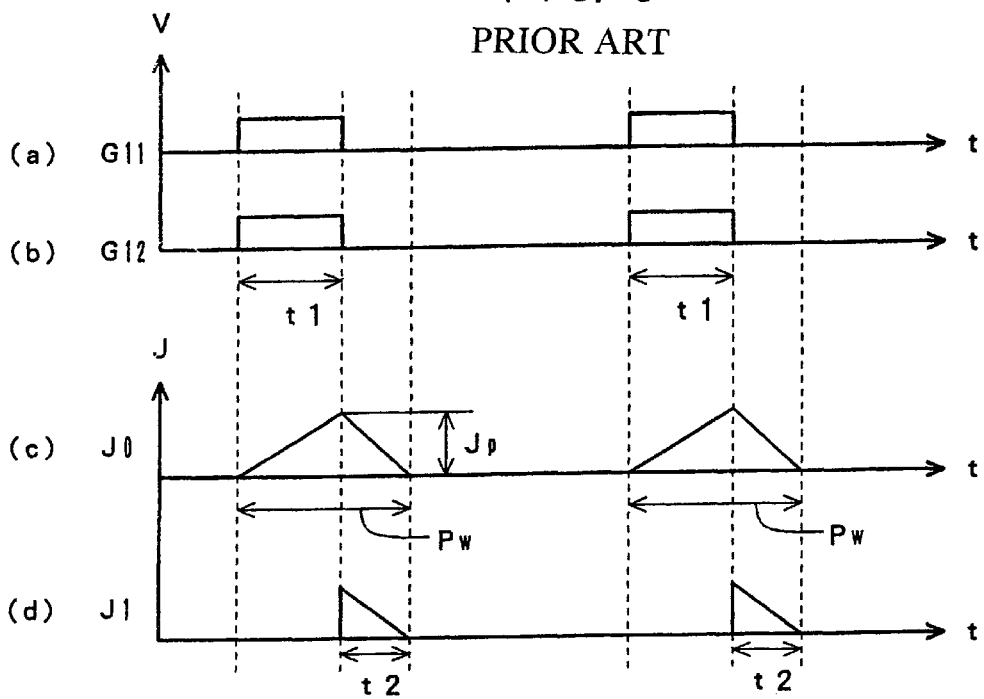
FIG. 9 is a diagram showing the operation timing and discharge current waveforms obtained when the DC power source voltage is lowered in the electric discharge machining power source unit of FIGS. 7A and 7B.
Figure 10:
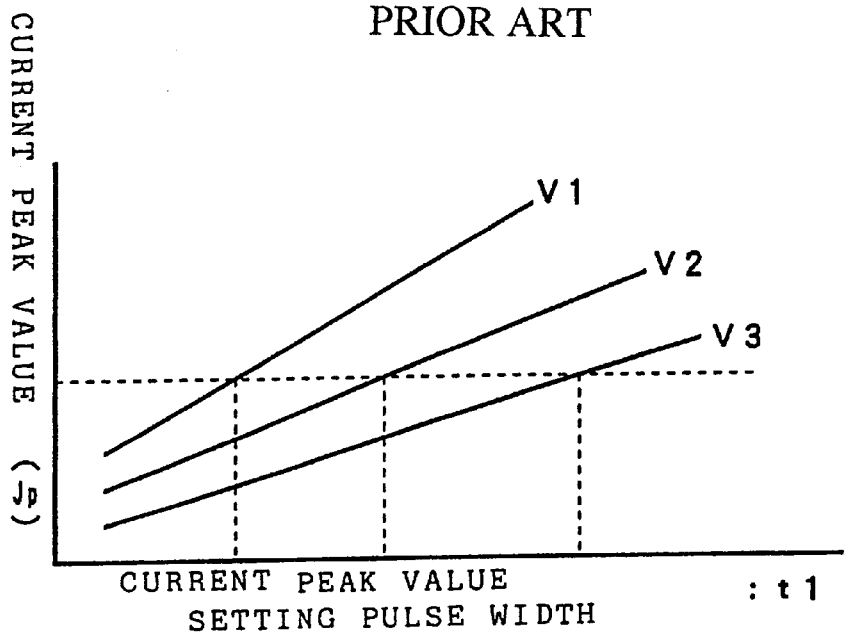
FIG. 10 is a diagram showing relations between the current peak value setting pulse width, current peak value, and DC power source voltage in the electric discharge machining power source unit of FIGS. 7A and 7B.
Figure 11:
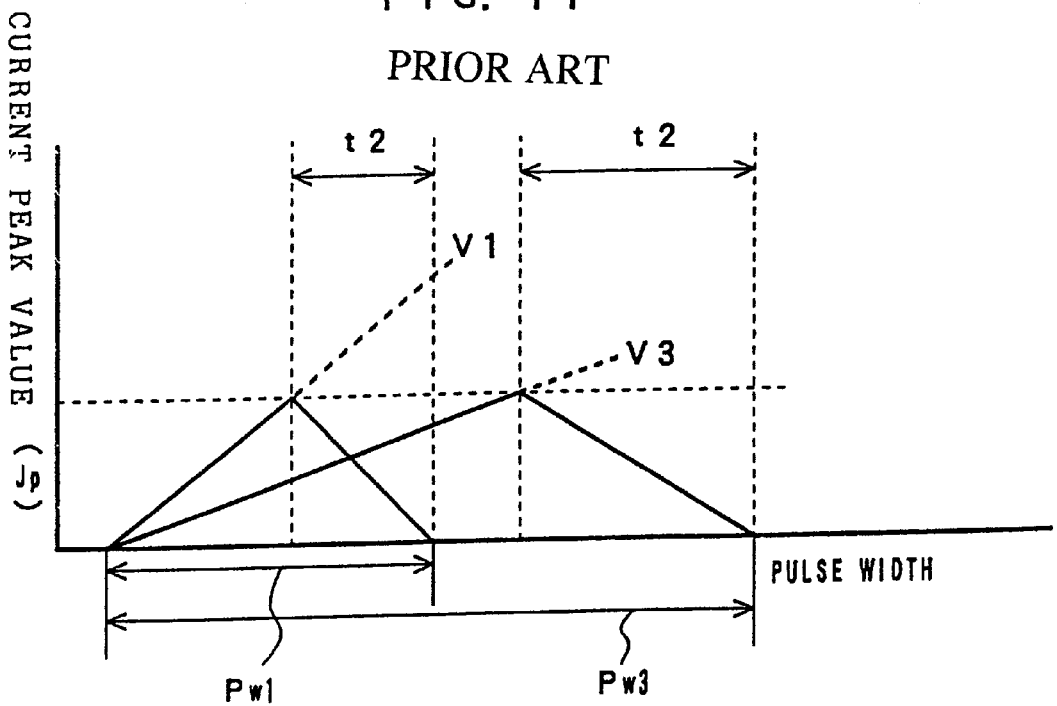
FIG. 11 is a diagram for illustrating machining pulse widths with which the same current peak value is obtained with the DC power source voltage varied, in the electric discharge machining power source unit of FIGS. 7A and 7B.
Figure 12:
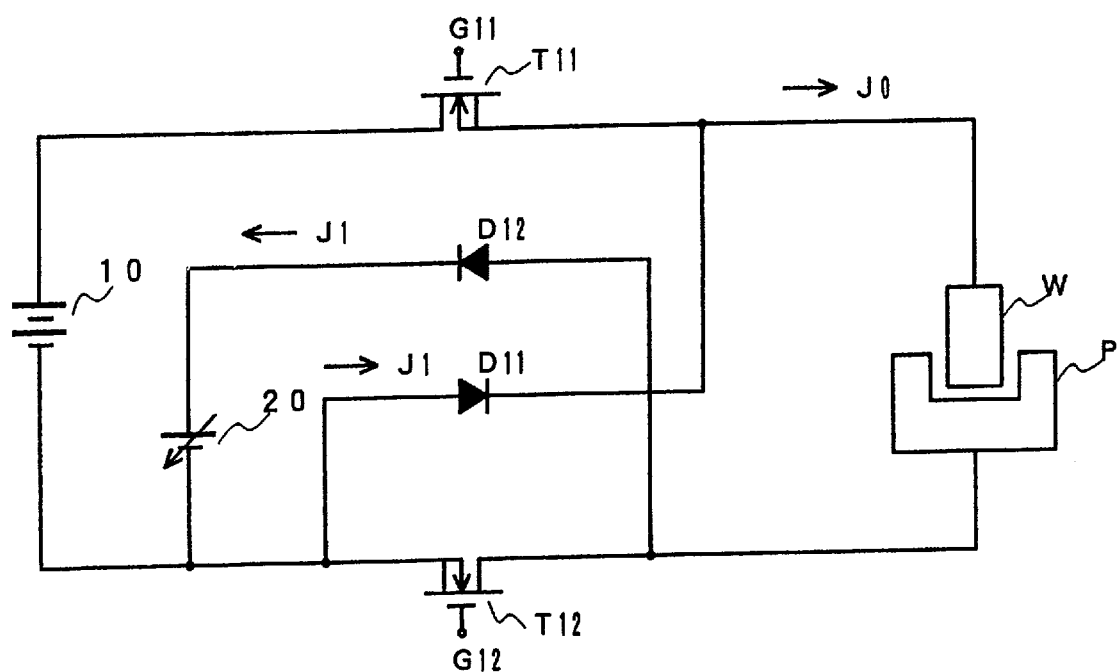
FIG. 12 is a circuit diagram of a conventional electric discharge machining power source having a DC power source for regeneration such that the machining pulse width can be adjusted.
Figure 13:
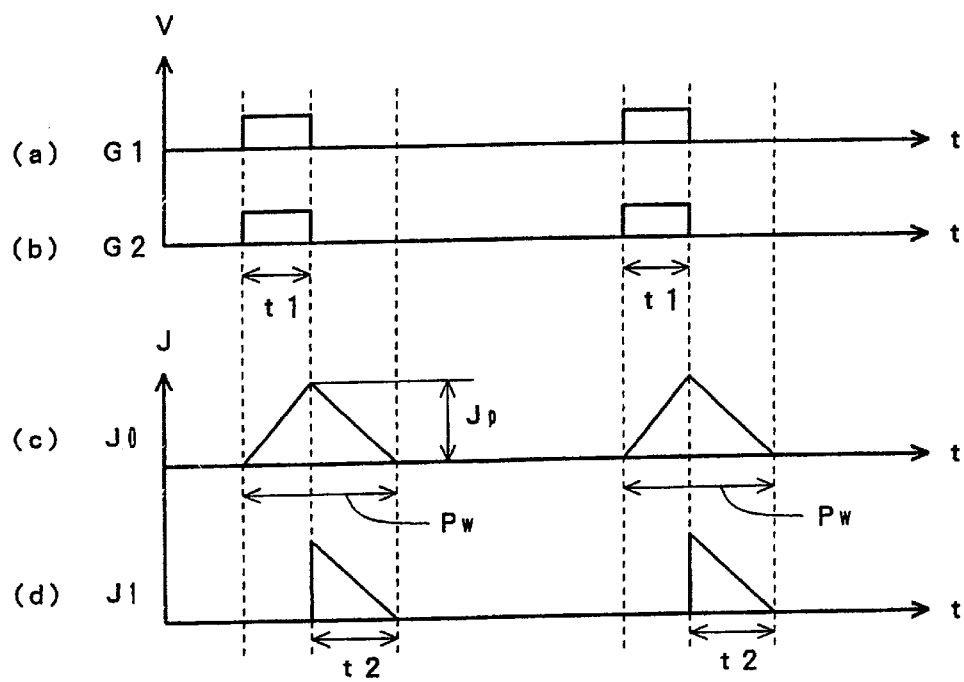
FIG. 13 is a diagram showing the operation timing and discharge current waveforms obtained when the voltage of the DC power source for regeneration is raised in the electric discharge machining power source unit shown in FIG. 12.
Figure 14:
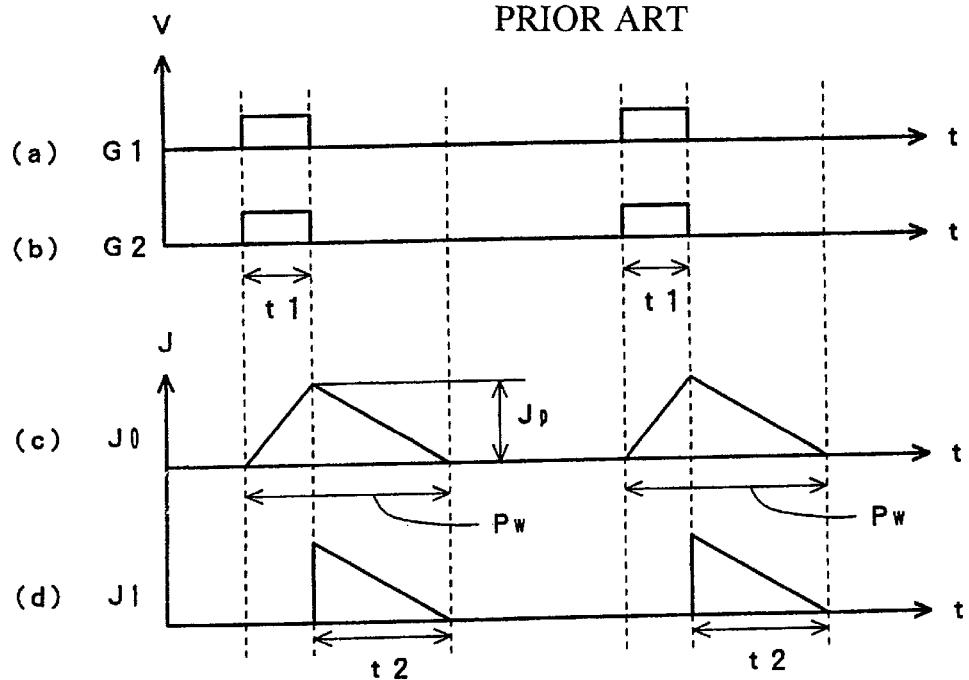
FIG. 14 is a diagram showing the operation timing and discharge current waveforms obtained when the voltage of the DC power source for regeneration is lowered in the electric discharge machining power source unit shown in FIG. 12.

Referring further to FIGS. 3A, 3B and 6, there will be described the construction and operation of an electric discharge machining power source unit according to a third embodiment of the present invention.

The electric discharge machining power source unit according to the third embodiment differs from the electric discharge machining power source unit according to the second embodiment described above in that the main DC power source 1 and the auxiliary DC power source 2 are connected in series with each other. More specifically, the positive terminal of the auxiliary DC power source 2 is connected to the negative terminal of the main DC power source 1, the positive terminal of the main DC power source 1 is connected to the workpiece W through the first switching element T1, and the negative terminal of the auxiliary DC power source 2 is connected to the machining electrode P through the second switching element T2.

The first diode D1 is connected in the forward direction between the workpiece W and a connection point between the auxiliary DC power source 2 and the main DC power source 1, while the second diode D2 is connected in the reverse direction between the positive terminal of the main DC power source 1 and the machining electrode P.

The first and second switching elements T1 and T2 are formed of an FET each. Their respective gates G1 and G2 are driven by means of the circuit shown in FIG. 3B. Since a circuit (FIG. 3B) for controlling the first and second switching elements shown in FIG. 3A is identical with that shown in FIG. 2B, a description of the circuit is omitted.

When a timing signal is delivered from the electric discharge timing generator circuit 4, the pulse distribution circuit 5 first outputs a pulse with a pulse width t2 that is set in accordance with the pulse width setting data (t2), and causes the second switching element driver circuit 7 to turn on the second switching element T2, as indicated by ((b) of FIG. 6.

In consequence, a current J0 flows from the auxiliary DC power source 2 to the workpiece W, machining electrode P, second switching element T2, and auxiliary DC power source 2 through the first diode D1, whereupon conduction points are secured ((c) and (d) of FIG. 6). Since the output voltage of the auxiliary DC power source 2 is low, this current rises gently.

Subsequently, however, a pulse with a time width t1 set in accordance with the current peak value setting data is delivered from the pulse distribution circuit 5 with a set delay time ((a) of FIG. 5), whereupon the first switching element driver circuit 6 is caused to turn on the first switching element T1 ((a) of FIG. 6). In consequence, current starts to flow from the high-voltage main DC power source 1, whereupon the machining current J0 between the workpiece W and the machining electrode P sharply rises, as indicated by (c) of FIG. 5.

When the first switching element T1 is turned off after the passage of the set time t1, the rise of the machining current J0 stops, whereupon the current J1 from the auxiliary DC power source 2 is supplied again between the workpiece W and the machining electrode P through the first diode D1, and the machining current J0 (=J1) flows without changing its peak value.

When the second switching element T2 is turned off after the passage of the set pulse time t2, a current J2 produced by induced energy that is accumulated by inductance in the circuit of FIG. 3A is fed back to the main DC power source 1 through the first diode D1, workpiece W, machining electrode P, and second diode D2. Accordingly, the fall of this machining current (J2=J0) is sharp. Thereafter, this operation is repeatedly executed to effect electric discharge machining.

In this third embodiment, a third switching element may be provided in place of the first diode D1. Since the first diode D1 constitutes a part of the circuit for feeding back the induced energy to the main DC power source 1, in this case, it is necessary only that a diode be connected in the reverse direction between the negative terminal of the auxiliary DC power source 2 and the workpiece W in order to feed back the induced energy. As in the case of the first embodiment, the third switching element must only be turned on or off at the same time with the second switching element T2.

In the case of this third embodiment also, the machining pulse width can be substantially determined by the pulse width setting data (t2), as indicated by (c) of FIG. 6. Further, a peak value JP of the current can be determined by the current peak value setting data (t1) for turning on the first switching element T1. Thus, the current peak value JP and the machining pulse width can be determined independently of each other, so that these values can be set with ease. Since the rise and fall of the machining current can be sharpened by utilizing the high main DC power source voltage, moreover, a substantially square machining current waveform can be obtained, so that the machining efficiency can be improved.

TABLE 1 is a table showing the respective performances of the electric discharge machining power source unit according to the present invention and the conventional electric discharge machining power source unit, compared by carrying out wire electric discharge machining using SKD11 for the material of the workpiece W and a brass wire of 0.2-mm diameter as the wire machining electrode P. TABLE 2 is a performance comparison table prepared by carrying out wire electric discharge machining using the electric discharge machining power source unit according to the present invention with the current peak value kept constant (at 210 A) and with the machining pulse width varied.

TABLE 1

Workpiece: SKD11 of 60-mm thickness
Electrode: brass wire of 0.2-mm diameter

|  | Performance by conventional circuit | Performance by the invention |
|---|---|---|
| Current peak value | 350 A | 200 A |
| Pulse width | 1.6 μsec | 1.1 μsec |
| Current waveform |  |  |

TABLE 1-continued

Workpiece: SKD11 of 60-mm thickness
Electrode: brass wire of 0.2-mm diameter

|  | Performance by conventional circuit | Performance by the invention |
|---|---|---|
| Liquid treatment pressure | 13 kgf/cm$^2$ | 10 kgf/cm$^2$ |
| Average machining voltage | 40 V | 40 V |
| Average machining Current | 5 A | 3 A |
| Area machining speed | 87 mm$^2$/min | 110 mm$^2$/min |
| Surface roughness | 24 μmRmax | 16 μmRmax |

TABLE 2

Workpiece: SKD11 of 60-mm thickness
Electrode: brass wire of 0.2-mm diameter
Liquid treatment pressure: 10 kgf/cm$^2$
Current peak value: 210 A

| Pulse width (μs) | Area machining speed (mm$^2$/min) | Surface roughness (μm Rmax) | Gap (mm) | Current (A) |
|---|---|---|---|---|
| 0.7 | 87 | 15 | 0.032 | 2.6 |
| 0.8 | 96 | 16 | 0.036 | 2.9 |
| 1.0 | 108 | 18 | 0.035 | 3.0 |
| 1.2 | 120 | 20 | 0.037 | 3.0 |
| 1.5 | 126 | 21 | 0.039 | 3.2 |

What is claimed is:

1. A power source unit for an electric discharge machine, comprising:

a first DC power source;

a second DC power source outputting a voltage lower than said first DC power source;

a pulse generator circuit respectively outputting first pulses having a set first width and second pulses having a set second width at respective time intervals;

a first circuit applying a voltage from said first DC power source between a machining electrode and a workpiece while the first pulses are being delivered from said pulse generator circuit;

a second circuit applying a voltage from said second DC power source between the machining electrode and the workpiece while the second pulses are being delivered from said pulse generator circuit; and a third circuit adapted to feed back a current produced by induced energy accumulated by inductance in said second circuit to said first DC power source in response to delivery of the first pulses from said pulse generator circuit being stopped, and delivery of said second pulses being stopped at a time thereafter.

2. A power source unit for an electric discharge machine according to claim 1, further comprising:

a first switching element;

a second switching element, and a third switching element, wherein one output terminal of said first DC power source and said machining electrode or said workpiece are connected through said first switching element, one output terminal of said second DC power source and said machining electrode or said workpiece are connected through said third switching element, and the other output terminal of said first DC power source and the other output terminal of said second DC terminal are both connected to said workpiece or said machining electrode through said second switching element, so that both said first switching and said second switching elements are turned on to form said first circuit while both said first and second pulses are being outputted, and both said third switching element and said second switching element are turned on to form said second circuit while said second pulses are being outputted without the delivery of said first pulses.

3. A power source unit for an electric discharge machine according to claim 2, wherein said third circuit includes a circuit designed so that the other output terminal of said first DC power source and said machining electrode or said workpiece are connected through a reversely-connected first diode and a circuit designed so that the one output terminal of said first DC power source and said workpiece or said machining electrode are to connected through a reversely-connected second diode.

4. A power source unit for an electric discharge machine according to claim 1, further comprising:

a first switching element; and a second switching element, wherein one output terminal of said first DC power source and said machining electrode or said workpiece are connected through said first switching element, one output terminal of said second DC power source and said machining electrode or said workpiece are connected through a diode, and the other output terminal of said first DC power source and the other output terminal of said second DC power source are both connected to said workpiece or said machining electrode through said second switching element, so that both said first switching element and said second switching element are turned on forming said first circuit while both said first and second pulses are being outputted, and said second switching element is turned on forming said second circuit without the activation of the first switching element while said second pulses are being outputted without the delivery of said first pulses.

5. A power source unit for an electric discharge machine according to claim 1, wherein said pulse generator circuit starts to output the second pulses in response to a command from a controller and then starts to output the first pulses after the passage of a given time, and finishes outputting the first pulses before delivery of the second pulses is finished.

6. A power source unit for an electric discharge machine, including a forwardly-connected diode and a reversely-connected diode, comprising:

a first switching element;

a first DC power source having one output terminal connected to a machining electrode or a workpiece through said first switching element;

a second switching element;

a second DC power source outputting a voltage lower than said first DC power source and having one output terminal connected to the other output terminal of said first DC power source and the other output terminal connected to said workpiece or said machining electrode through said second switching element; and a pulse generator circuit respectively outputting first pulses having a set first width and second pulses having a set second width at respective time intervals, wherein the one output terminal of said second DC power source and said machining electrode or said workpiece are connected through the forwardly-connected first diode, the one output terminal of said first DC power source and said workpiece or said machining electrode are connected through the reversely-connected second diode, and said first switching element is controlled by the first pulses and said second and third switching elements are controlled by the second pulses.

7. A power source unit for an electric discharge machine, including a forwardly-connected diode and a reversely-connected diode, comprising:

a first switching element;

a first DC power source having one output terminal connected to a machining electrode or a workpiece through said first switching element;

a second switching element;

a second DC power source outputting a voltage lower than said first DC power source and having one output terminal connected to the other output terminal of said first DC power source and the other output terminal thereof connected to said workpiece or said machining electrode through said second switching element;

a pulse generator circuit respectively outputting first pulses having a set first width and second pulses having a set second width at time intervals; and a third switching element, wherein the one output terminal of said second DC power source and said machining electrode or said workpiece are connected through said third switching element, the other output terminal of said second DC power source and said machining electrode or said workpiece are connected through the reversely-connected first diode, the one output terminal of said first DC power source and said workpiece or said machining electrode are connected through the reversely-connected second diode, and said first switching element is controlled by the first pulses and said second and third switching elements are controlled by the second pulses.

8. An electric discharge machine power source unit, comprising:

a first DC power source;

a second DC power source;

a pulse generator circuit to supply first and second pulses to first and second circuits, respectively, wherein the first pulses are generated for a first period of time and second pulses are generated for a second period of time, and the first and second periods of time overlap, wherein the first circuit applies a voltage, from said first DC power source, between a machining electrode and a workpiece while the first pulses are being supplied;

the second circuit applies a voltage, from said second DC power source, between the machining electrode and the workpiece while the second pulses are being supplied; and a third circuit feeds back a current produced by induced energy accumulated by inductance in the second circuit to said first DC power source when supply of the first pulses is stopped.

\* \* \* \* \*

UNITED STATES PATENT AND TRADEMARK OFFICE
CERTIFICATE OF CORRECTION

PATENT NO.: 6,130,510
DATED : October 10, 2000
INVENTOR(S): Masaki KURIHARA et al.

It is certified that errors appear in the above-identified patent and that said Letters Patent is hereby corrected as shown below:

On the title page, item:

[56] FOREIGN PATENT DOCUMENTS
after "62-287911" insert --A--; and
after "07290317" insert --A--.

Title Page,
Assistant Examiner - change "Trn" to --Tran--.

Column 4,
line 47, change "themal" to --thermal--.

Column 8,
line 30, after "5" insert --)--.*

Column 9,
line 50, after "6" insert --)--.*

Signed and Sealed this

Eighth Day of May, 2001

*Attest:*

NICHOLAS P. GODICI

*Attesting Officer*       *Acting Director of the United States Patent and Trademark Office*